United States Patent
Fischer et al.

(10) Patent No.: US 9,321,133 B2
(45) Date of Patent: Apr. 26, 2016

(54) FLUX MOISTURE CONTROL FOR SUB-ARC WELDING PROCESS

(71) Applicant: LINCOLN GLOBAL, INC, City of Industry, CA (US)

(72) Inventors: Ulrich M. Fischer, Essen (DE); Steven R. Sumner, Brunswick, OH (US); Patrick S. Wahlen, Jupiter, FL (US)

(73) Assignee: LINCOLN GLOBAL, INC., City of Industry, CA (US)

(*) Notice: Subject to any disclaimer, the term of this patent is extended or adjusted under 35 U.S.C. 154(b) by 452 days.

(21) Appl. No.: 13/775,873

(22) Filed: Feb. 25, 2013

(65) Prior Publication Data

US 2014/0131339 A1    May 15, 2014

Related U.S. Application Data

(60) Provisional application No. 61/725,671, filed on Nov. 13, 2012.

(51) Int. Cl.
| | |
|---|---|
| *B23K 11/00* | (2006.01) |
| *B23K 31/12* | (2006.01) |
| *B23K 37/00* | (2006.01) |
| *B23K 9/095* | (2006.01) |
| *B23K 9/18* | (2006.01) |
| *B23K 31/00* | (2006.01) |

(52) U.S. Cl.
CPC ........... *B23K 31/12* (2013.01); *B23K 9/0956* (2013.01); *B23K 9/18* (2013.01); *B23K 31/003* (2013.01); *B23K 37/00* (2013.01)

(58) Field of Classification Search
CPC ...... B23K 31/003; B23K 31/12; B23K 37/00; B23K 9/0956; B23K 9/18
USPC ........... 228/103, 33, 178, 218–225, 102, 104, 228/9, 43; 219/148, 121.11, 121.13, 219/121.23, 121.33, 121.55, 127–129, 136, 219/137 R, 137.41, 137.42, 145.22, 145.23
See application file for complete search history.

(56) References Cited

U.S. PATENT DOCUMENTS

| | | | | |
|---|---|---|---|---|
| 3,501,354 | A | * | 3/1970 | De Long .......................... 148/23 |
| 3,585,352 | A | * | 6/1971 | Zvanut ............... B23K 35/0266 219/137 R |

(Continued)

FOREIGN PATENT DOCUMENTS

| | | | | |
|---|---|---|---|---|
| DE | 4138628 | A1 | * 7/1992 | ......... B23K 35/3612 |
| EP | 0934799 | A2 | 8/1999 | |

(Continued)

OTHER PUBLICATIONS

DE4138628_A1_translation.pdf.*

(Continued)

*Primary Examiner* — Dana Ross
*Assistant Examiner* — Ket D Dang
(74) *Attorney, Agent, or Firm* — Foley & Lardner LLP

(57) ABSTRACT

The invention described herein generally pertains to a system and method for detecting a moisture with a flux used in a welding process. A sensor is employed with a flux source that supplies a welding operation or process in which the sensor detects a moisture level with a flux within the flux source. A monitor component is configured to receive or aggregate data from the sensor, wherein the data relates to the moisture level associated with a flux supply or a portion of flux.

6 Claims, 5 Drawing Sheets

(56) References Cited

U.S. PATENT DOCUMENTS

| | | | | |
|---|---|---|---|---|
| 3,848,109 | A | * | 11/1974 | Zvanut ............... B23K 35/0266 219/146.23 |
| 3,876,853 | A | * | 4/1975 | Takahashi et al. ........... 219/73.1 |
| 4,450,711 | A | * | 5/1984 | Claude ..................... F16L 9/18 340/605 |
| 5,179,282 | A | * | 1/1993 | Modinger .......... B23K 35/3612 228/56.5 |
| 2005/0044687 | A1 | * | 3/2005 | Matsuguchi .......... B21C 37/042 29/455.1 |
| 2008/0178734 | A1 | * | 7/2008 | Butler ................ B23K 35/0266 95/12 |
| 2009/0159576 | A1 | | 6/2009 | Sommerfeld |
| 2010/0051671 | A1 | * | 3/2010 | Ling et al. .................... 228/103 |
| 2011/0031297 | A1 | * | 2/2011 | Nakaya et al. ................ 228/102 |

FOREIGN PATENT DOCUMENTS

| | | | |
|---|---|---|---|
| FR | 2945759 | A1 | 11/2010 |
| JP | 49067850 | A * | 7/1974 |
| JP | 56084197 | A * | 7/1981 ............. B23K 35/40 |

OTHER PUBLICATIONS

PCT/IB2013/002520 International Written Opinion of the International Searching Authority.

* cited by examiner

FLUX MOISTURE CONTROL FOR SUB-ARC WELDING PROCESS

CROSS-REFERENCE TO RELATED APPLICATIONS

This application claims the benefit of priority to U.S. Provisional Application Ser. No. 61/725,671, filed Nov. 13, 2012, and entitled "FLUX MOISTURE CONTROL FOR SUB-ARC WELDING PROCESS." The entirety of the aforementioned application is incorporated herein by reference.

TECHNICAL FIELD

The invention described herein pertains generally to a system and method that employs in-situ monitoring for moisture with a flux source that supplies flux to a welding process.

BACKGROUND OF THE INVENTION

Welding systems reside at the core of the modern industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a work piece while current is passed through the electrode and across an arc developed between the electrode and the work piece. The electrode may be a non-consumable or consumable type, wherein portions of the electrode may be melted and deposited on the work piece. Often, hundreds or perhaps thousands of welders are employed to drive multiple aspects of an assembly process, wherein sophisticated controllers enable individual welders to operate within relevant portions of the process. Hydrogen introduced into a weld operation or process can compromise weld integrity based upon, for instance, hydrogen increasing porosity of the weld. Hydrogen can be introduced into a weld operation or process through flux since flux can absorb moisture from ambient air during storage.

As mentioned, a weld operation or process can be compromised with flux absorbing moisture from ambient air of a welding environment and what is needed is an improved welding technique to facilitate reduction of hydrogen in a weld process.

SUMMARY OF THE INVENTION

In accordance with the present invention, there is provided a process for detecting moisture (e.g., gaseous-water vapor) in a flux supply used during a welding process comprising the steps of: employing a welding process with a portion of flux from a flux source; monitoring the flux source in-situ to detect a level of moisture in the portion of flux; collecting a parameter related to the welding process during the step of monitoring; and associating the parameter to the level of moisture detected.

In accordance with the present invention, there is provided a welder system that comprises: a flux source that supplies a portion of flux to a welding process; a sensor that measures moisture with the portion of flux; a first component configured to collect a parameter related to the welding process; and a second component configured to aggregate a moisture level for the portion of flux.

In accordance with the present invention, there is provided a welder system that comprises: means for employing a welding process with a portion of flux from a flux source; means for monitoring the flux source in-situ to detect moisture in the portion of flux; means for collecting a parameter related to the welding process during the step of monitoring; and means for associating the parameter to the portion of moisture detected.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to methods and systems that generally relate to detecting moisture with a flux used in a welding process. A sensor is employed with a flux source that supplies a welding operation or process in which the sensor detects a moisture level with a flux within the flux source. A monitor component is configured to receive or aggregate data from the sensor, wherein the data relates to the moisture level associated with a flux supply or a portion of flux. In an embodiment, the welding process (to which the flux is used) or the flux can be adjusted (e.g., moisture content adjustment) based on the sensor data evaluated. In another embodiment, the moisture level detected can be associated with a parameter of the welding process such that a measure of the parameter is correlated to the detected moisture level.

Figure 1:
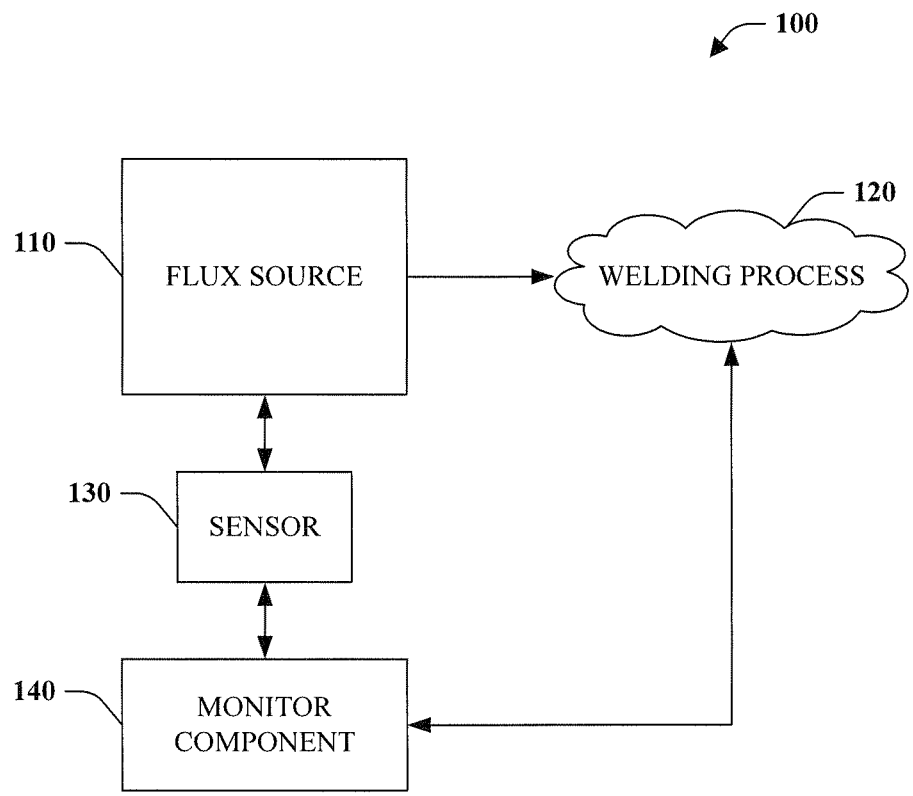
FIG. 1 is a block diagram illustrating a welder system that facilitates detecting a moisture level with a flux supply used for a welding process.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIG. 1 illustrates a schematic block diagram of welder system 100 that facilitates detecting a moisture level with a flux supply used for a welding process. Welder system 100 includes flux source 110 that supplies at least a portion of flux to weld process 120. By way of example and not limitation, weld process can be any suitable welding operation that utilizes a portion of flux from flux source 110 such as a sub-arc welding process. Still, it is to be appreciated and understood that system 100 can be employed with any welding operation selected with sound engineering judgment without departing from the intended scope of coverage of the embodiments of the subject invention.

System 100 includes sensor 130 that detects a level of moisture within at least a portion of flux used in welding process 120. Sensor 130 detects moisture within the flux in-situ, wherein the flux can be contained or housed in flux source 110. By way of example, and not limitation, flux source 110 can be any location related to a storage or containment of a portion of flux such as, but not limited to, a flux hopper, a flux buffer storage, a container, a storage container, a manipulator, a flux separator, a flux recovery system, a flux recycling system, among others. Sensor 130 detects real-time levels related to a moisture amount with flux contained or used in flux source 110, which in turn, is used in welding process 120. It is to be appreciated that sensor 130 can be a stand-alone sensor (as depicted), incorporated into flux source 110, or a combination thereof. By way of example and not limitation, sensor 130 can be a moisture sensor, a laser detection system, among others.

System 100 includes monitor component 140 that is configured to collect or receive data from sensor 130, wherein the data relates to the level of moisture detected in real-time and in-situ for the flux or portion of flux. Monitor component 140 can be electronically coupled to sensor 130 to receive or request information associated with the detected levels of moisture in the flux or in the flux used in flux source 110. It is to be appreciated and understood that monitor component 140 can be a stand-alone component (as depicted), incorporated into sensor 130, or a combination thereof.

Additionally, monitor component 140 is configured to collect one or more parameters related to welding process 120. By way of example and not limitation, the parameter can be a voltage for the welding process, a current for the welding process, a relative humidity, a relative temperature, a diameter of a wire used in the welding process, a type of the portion of flux, a hydrophilic amount of the portion of flux, a hydrophobic amount of the portion of the flux, and the like. Based on the real-time data collection of sensor 130 and the parameter, monitor component 140 correlates a detected level of moisture of flux to the collected parameter.

In an embodiment, a collected parameter reading or level can be correlated or correspond to a level of moisture detected by monitor component 140. The correlation is utilized to configure a welding process (e.g., current or future) based on a target moisture level. For instance, a first welding process can be monitored in which a moisture level A is detected and a voltage (e.g., the parameter(s)) B is collected. An additional welding process can be targeted at the moisture level A in which monitor component 140 can configure the voltage to be at voltage B to achieve such result (e.g., moisture level targeted).

In one embodiment, monitor component 140 is a computer operable to execute the disclosed methodologies and processes, including methods 400 and 500 described herein. In order to provide additional context for various aspects of the present invention, the following discussion is intended to provide a brief, general description of a suitable computing environment in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and/or software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices. For instance, a remote database, a local database, a cloud-computing platform, a cloud database, or a combination thereof can be utilized with monitor component 140.

The monitor component 140 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within monitor component 140, such as during start-up, is stored in the ROM.

Monitor component 140 can further include a hard disk drive, a magnetic disk drive, e.g., to read from or write to a removable disk, and an optical disk drive, e.g., for reading a CD-ROM disk or to read from or write to other optical media. Monitor component 140 can include at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by monitor component 140.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), Near Field Communications (NFC), Radio Frequency Identification (RFID), infrared, and/or other wireless media. Combinations of any of the above should also be included within the scope of computer readable media.

A number of program modules may be stored in the drives and RAM, including an operating system, one or more application programs, other program modules, and program data. The operating system in monitor component 140 can be any of a number of commercially available operating systems.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Alternatively or in addition, a local or cloud (e.g., local, cloud, remote, among others) computing platform can be utilized for data aggregation, processing, and delivery. For this purpose, the cloud computing platform can include a plurality of processors, memory, and servers in a particular remote location. Under a software-as-a-service (SaaS) paradigm, a single application is employed by a plurality of users to access data resident in the cloud. In this manner, processing requirements at a local level are mitigated as data processing is generally done in the cloud, thereby relieving user network resources. The software-as-a-service application allows users to log into a web-based service (e.g., via a web browser) which hosts all the programs resident in the cloud.

In an example, a plurality of users can access a local or cloud database (e.g., local database, cloud database, remote database, among others) computing platform (e.g., monitor component 140) via a web-based application on a computing device, such as a tablet, pad, laptop, cell phone, computer, or other component. The web-based application can allow a user to configure particular reports that quantify data in substantially any format and in comparison to any number of metrics, such as performance benchmarks and the like. Moreover, the software applications can be updated and distributed in a global fashion to insure that each user is using the latest and greatest technology.

Figure 2:
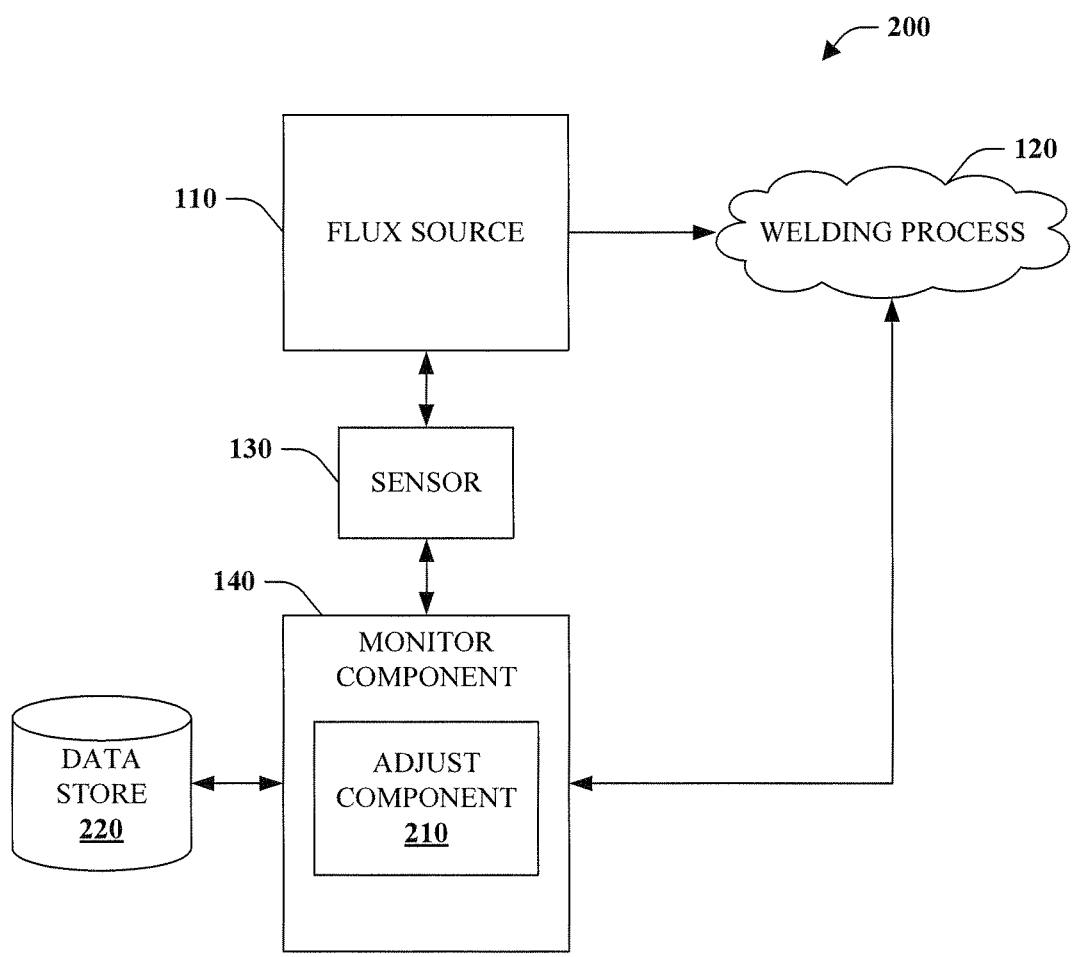
FIG. 2 is a block diagram illustrating a welder system that adjusts a flux supply used for a welding process based on a real-time detected moisture content.

FIG. 2 illustrates welder system 200 that adjusts a flux supply used for a welding process based on a real-time detected moisture content in order to reduce hydrogen content in a weld. System 200 includes monitor component 140 that collects real-time data related to moisture levels of flux (e.g., contained within flux source 110, used with flux source 110, or a combination thereof) detected by sensor 130. Monitor component 140 can modify at least one of flux source 110 or welding process 120 based upon the detected moisture level. Moreover, monitor component 140 collects or receives a measurement or reading of a parameter of welding process 120.

System 200 includes adjust component 210 that is configured to modify at least one of welding process 120, flux source 110, a portion of flux, or a combination thereof. In an embodiment, adjust component 210 utilizes a threshold range in which the threshold range indicates acceptable detection levels for a moisture level. It is to be appreciated that the threshold range can be dynamically adjusted, statically defined, or a combination thereof. For instance, a real-time loop can be utilized to continuously identify a threshold or threshold range and adjust based on each reading or level detection with a suitable cycle, frequency, or sampling rate. Moreover, the threshold can be a range that accounts for variations in readings based on, for instance, a type of welding process, an environment of the welding process, sensitivity to moisture or hydrogen, among others.

Based on a threshold range, adjust component 210 can adjust or modify system 200. For instance, if the detection of moisture is within a defined threshold range (e.g., a tolerable level of moisture for the flux), no adjustment may be made. Yet, if the detection of moisture is outside the defined threshold range (e.g., an intolerable level of moisture for the flux), an adjustment may be made. For instance, the adjustment by adjust component 210 can be, but is not limited to being, a termination of welding process 120, a stoppage of a portion of welding process 120, an adjustment to a moisture level of flux (e.g., increase moisture level, decrease moisture level), an adjustment of a humidity level of flux, among others. For instance, a level of moisture that is too high for a threshold range can trigger an adjustment (e.g., lowering in this case) to the moisture level of flux by heating the flux to a temperature to remove excess moisture.

By way of example and not limitation, monitor component 140 can aggregate data in data store 220. In another embodiment, welding process 120 can communicate one or more parameter or data to data store 220, wherein monitor component 140 accesses such data or parameters. It is to be appreciated that data store 220 can be a local database, a cloud database, or a combination thereof and monitor component 140 accesses data therefrom in order to evaluate and identify a parameter, moisture level, or hydrogen level of a weld.

It is to be appreciated that data store 220 can be a stand-alone component (as depicted), incorporated into monitor component 140, incorporated into sensor 130, or a combination thereof. A "data store" or "memory" can be, for example, either volatile memory or nonvolatile memory, or can include both volatile and nonvolatile memory. The data store of the subject systems and methods is intended to comprise, without being limited to, these and other suitable types of memory. In addition, the data store can be a server, a database, a hard drive, a flash drive, an external hard drive, a portable hard drive, a cloud-based storage, and the like.

Figure 3:
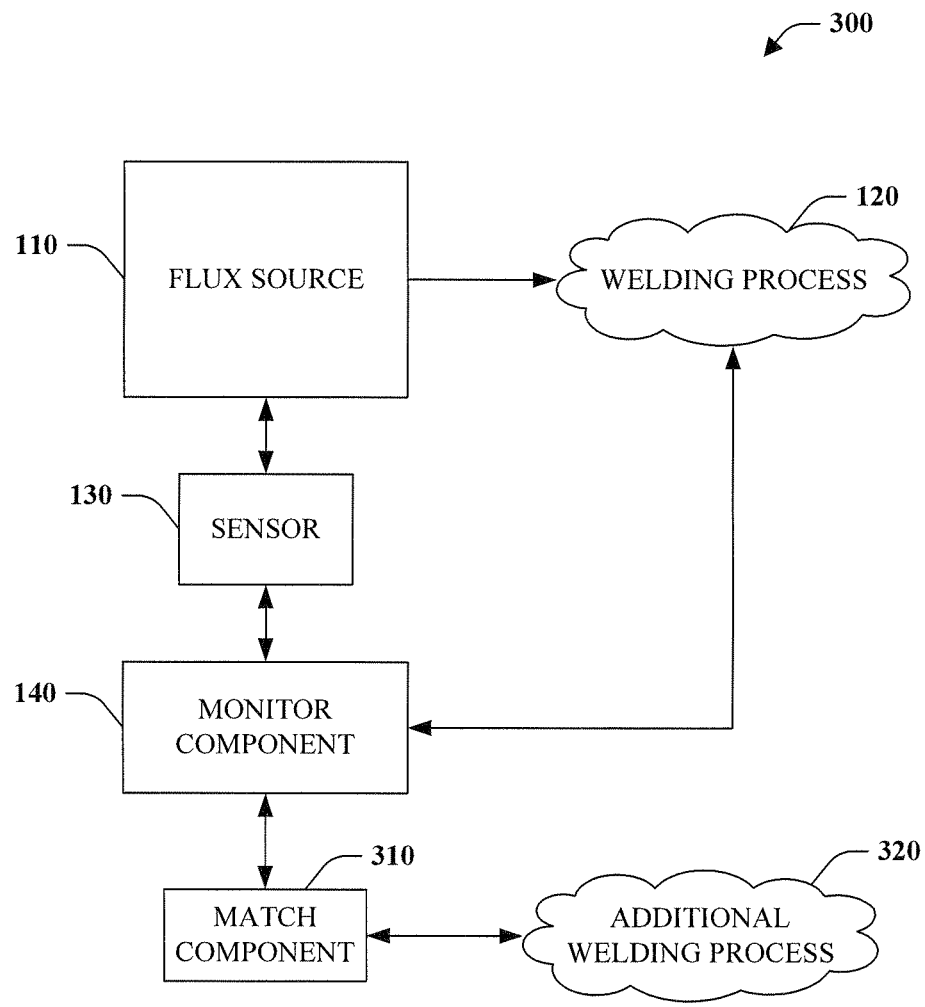
FIG. 3 is a block diagram illustrating a welder system that employs a welding parameter for a welding process based upon a target moisture level of a portion of flux.

FIG. 3 illustrates welder system 300 that employs a welding parameter for a welding process based upon a targeted moisture level of a portion of flux. System 300 further includes match component 310 that is configured to evaluate one or more collected parameters of welding process 120 in order to configure an additional welding process 320. In other words, match component 310 can leverage collected data (e.g., moisture level and corresponding welding parameter reading, hydrogen level of a weld and corresponding welding parameter reading, among others) to control or configure a second welding process that includes similar characteristics or desired characteristics related to the collected data.

For example, additional welding process 320 can desire a particular moisture level. Based on the real-time data collections related to welding process 120 and/or other processes (historically collected and tracked), the particular moisture level can be achieved by implementing one or more parameter settings associated with such moisture level. It is to be appreciated that any number of parameters collected for a moisture level can be utilized with additional welding process 320.

In another example, system 300 corresponds a moisture level detected with the flux source to a hydrogen content detected with a weld created from the welding process. Based on such real-time data collections (e.g., moisture levels and corresponding hydrogen content for welds) related to welding process 120 and/or other processes (e.g., historically collected and/or tracked), a particular hydrogen level can be targeted for additional welding process 320 in which a corresponding moisture level can correspond and implement in additional welding process 320 based on data from welding process 120.

In an embodiment, system 300 can further adjust the welding process based on the moisture level of the portion of the flux. By way of example and not limitation, a moisture level with the flux source can be adjusted, a temperature controller that regulates a temperature for the portion of flux can be adjusted, or a humidity level associated with the flux can be adjusted. In an embodiment, the system associates a collected parameter with a moisture level detected for the portion of flux used in the welding process. Furthermore, the parameter can be utilized or employed with an additional welding process to achieve a targeted moisture level (e.g., the targeted moisture level was detected with the parameter implemented). By way of example and not limitation, the parameter is at least one of a voltage for the welding process, a current for the welding process, a relative humidity, a relative temperature, a diameter of a wire used in the welding process, a type of the portion of flux, a hydrophilic amount of the portion of flux, or a hydrophobic amount of the portion of the flux.

System 300 can include a monitoring platform (e.g., software-based, hardware-based, remote, cloud-based, local, combination thereof) that measures and records moisture level of flux during a weld process. The platform can monitor the physical or chemical characteristics of welding flux during the welding process, which can be integrated into an enterprise wide production monitoring system. In response to the data captured, weld parameters can be changed within a welding process (e.g., submerged arc process) based upon the previously measured physical or chemical characteristics of welding flux in real-time as the weld progresses.

System 300 or monitoring platform can include one or more sensors (e.g., sensor 130) to measure moisture in flux. In an embodiment, the sensors can be located within the flux delivery system (e.g., flux supply source for a weld operation). By way of example and not limitation, the sensor can be located on a bottom end of a flux hoppers, at a buffer storage, at a rear head, at a manipulator, at a flux accumulator, among others. The data collected from the sensor can be communicated to or collected by the system platform (e.g., periodically, continuously, and the like) during weld processes. Capturing such data can allow metrics to be stored along with the production of components in manufacturing. An acceptable moisture content level can be used as a quality metric that is used. If the moisture level is too high, the system can, for example, shut down the weld operation to prevent the use of poor flux, which can lead to a low quality weld. This data can be used for warranty claims to provide traceability and better facilitate quality control.

Figure 4:
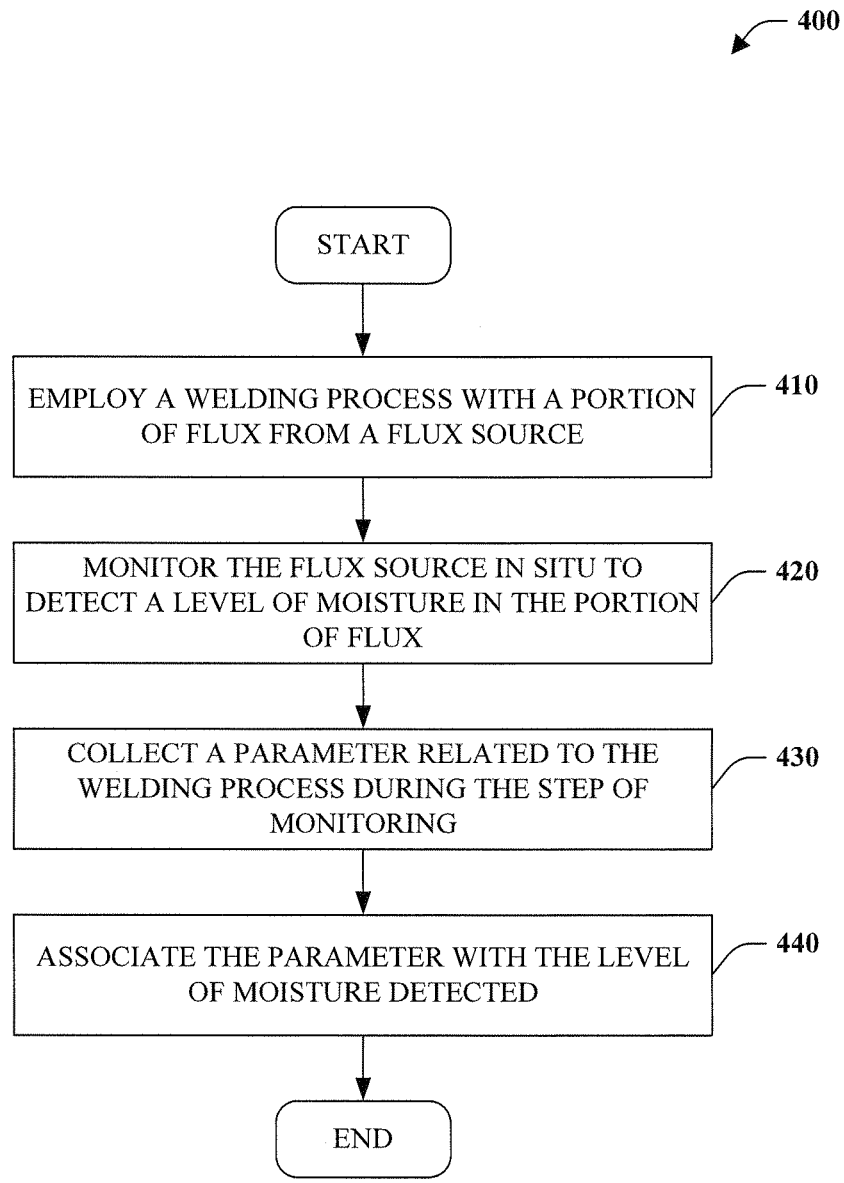
FIG. 4 is a flow diagram of adjusting a parameter of a welding process based upon a moisture level detected with a portion of flux.
Figure 5:
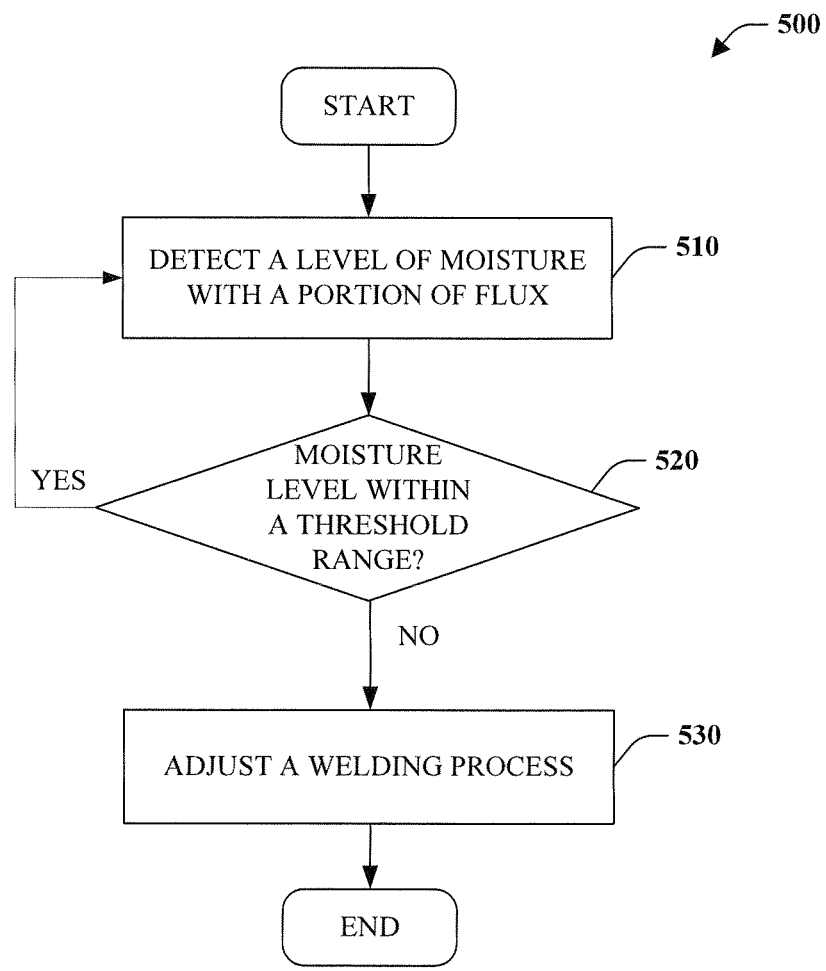
FIG. 5 is a flow diagram of associating a moisture level reading of flux with a welder parameter of a welding process.

In view of the exemplary devices and elements described supra, methodologies that may be implemented in accordance with the disclosed subject matter will be better appreciated with reference to the flow charts and/or methodologies of FIGS. 4-5. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

Sequentially, the following occurs as illustrated in the decision tree flow diagram 400 of FIG. 4 which is a flow diagram 400 that adjusts a parameter of a welding process based upon a moisture level detected with a portion of flux. A welding process can be employed with a portion of flux from a flux source (reference block 410). The flux source can be monitored in-situ to detect a level of moisture in the portion of flux (reference block 420). A parameter related to the welding process can be collected during the step of monitoring (reference block 430). The parameter can be associated with the level of moisture detected (reference block 440).

FIG. 5 illustrates flow diagram 500 related to associating a moisture level reading of flux with a welder parameter of a welding process. A portion of moisture (e.g., an amount of moisture) for a portion of flux used in a welding process is detected (reference block 510). The portion of moisture is compared to a threshold range to determine whether the portion of moisture is within the threshold range (reference block 520). If the portion of moisture is within the threshold range, the methodology 500 continues to detect the portion of moisture for a portion of flux (reference block 510). If the portion of moisture is not within the threshold range, the methodology continues to adjust the welding process (reference block 530). By way of example and not limitation, the welding process can be adjusted by a shutdown (e.g., a termination of the welding process, a stoppage of the welding process, among others), a temperature adjustment for the flux or a storage area for the flux, an adjustment to a moisture level for the flux, a humidity adjustment, an adjustment to a parameter of the welding process, among others.

In an embodiment, the parameter is at least one of a voltage for the welding process, a current for the welding process, a relative humidity, a relative temperature, a diameter of a wire used in the welding process, a type of the portion of flux, a hydrophilic amount of the portion of flux, a hydrophobic amount of the portion of the flux, among others. In another embodiment, the method includes identifying a threshold range for the portion of moisture detected with the flux source and communicating a notification based on a comparison of the threshold range to the portion of moisture detected. In an embodiment, the method includes terminating the welding process based on the comparison, wherein the comparison indicates the portion of moisture detected is outside the threshold range. In an embodiment, the welding process can be adjusted based on the comparison, wherein the comparison indicates the portion of moisture detected is outside the threshold range.

In an embodiment, the method includes removing moisture from the flux source based upon the comparison. In an embodiment, the method includes heating the portion of flux from the flux source to remove moisture based on the comparison. The method includes identifying a target level of moisture for an additional welding process and utilizing one or more collected parameters from the welding process with the additional welding process to achieve the target level of moisture within the additional welding process.

In an embodiment, the method includes correlating the detecting portion of moisture from the flux source to a reading of the parameter. The method can include aggregating a reading of the portion of moisture detected of the flux source for the welding process. For example, the method can include utilizing the reading as a threshold for an additional welding process, wherein the threshold includes a deviation. In another example, the method can include utilizing the parameter with an additional welding process to achieve the reading of the portion of moisture detected of the flux source. In an embodiment, the method includes comparing at least one parameter of the welding process with at least one parameter of an additional welding process and generating a threshold range for one or more welding processes based on the comparison.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welder system, comprising:
    a flux source configured to supply at least a portion of flux for a welding process;
    a sensor configured to measure a moisture content of the portion of flux during the welding process, wherein the sensor is located within a flux delivery system that includes the flux source;
    a first component configured to collect a parameter related to the welding process, wherein the first component is configured to utilize the parameter with an additional welding process to achieve the moisture content of the portion of flux in the additional welding process; wherein the parameter is at least one of a voltage for the welding process, a current for the welding process, a relative humidity, a relative temperature, a diameter of a wire used in the welding process, a type of the portion of flux, a hydrophilic amount of the portion of flux, or a hydrophobic amount of the portion of the flux; and
    a second component configured to aggregate data from the sensor, wherein the data includes the moisture content of the portion of flux.

2. The welder system of claim 1, further comprising a third component configured to adjust the welding process based on the moisture content of the portion of the flux.

3. The welder system of claim 2, wherein the third component is configured to adjust at least one of a moisture level associated with the flux source or a temperature of the portion of flux.

4. The welder system of claim 1, wherein the first component is configured to associate the parameter collected with the moisture content of the portion of flux used in the welding process.

5. The welder system of claim 1, wherein the sensor is located within the flux source and is configured to measure the moisture content of the portion of flux within the flux source.

6. The welder system of claim 1, wherein the flux source comprises a flux hopper, a flux buffer storage component, or a flux recovery system.

* * * * *